(12) United States Patent
Spencer

(10) Patent No.: US 11,246,268 B2
(45) Date of Patent: Feb. 15, 2022

(54) POTTED PLANT TRAY

(71) Applicant: Michael L. Spencer, Salem, OR (US)

(72) Inventor: Michael L. Spencer, Salem, OR (US)

(*) Notice: Subject to any disclaimer, the term of this patent is extended or adjusted under 35 U.S.C. 154(b) by 246 days.

(21) Appl. No.: 16/518,870

(22) Filed: Jul. 22, 2019

(65) Prior Publication Data
US 2020/0029506 A1 Jan. 30, 2020

Related U.S. Application Data

(60) Provisional application No. 62/711,126, filed on Jul. 27, 2018.

(51) Int. Cl.
*A01G 9/04* (2006.01)

(52) U.S. Cl.
CPC ...................... *A01G 9/04* (2013.01)

(58) Field of Classification Search
CPC .......... A01G 9/04; A01G 9/042; A01G 9/045; A01G 9/047; A01G 31/06; A01G 31/00; A01G 31/02
See application file for complete search history.

(56) References Cited

U.S. PATENT DOCUMENTS

| | | | | |
|---|---|---|---|---|
| 5,341,596 A * | 8/1994 | Kao | ................. | A01G 27/04 47/71 |
| 6,035,578 A * | 3/2000 | Lo | ................. | A01G 31/02 47/61 |
| 6,134,831 A * | 10/2000 | Lo | ................. | A01G 31/06 47/61 |
| 6,766,615 B2 * | 7/2004 | Smead | ................. | A01G 9/04 47/71 |
| 7,093,391 B2 * | 8/2006 | Eakin | ................. | A01G 9/04 47/39 |
| 8,371,066 B2 * | 2/2013 | Mathy | ................. | A01G 9/033 47/66.5 |
| 8,555,547 B2 * | 10/2013 | Hashimoto | ................. | A01G 27/00 47/79 |
| 10,076,196 B2 * | 9/2018 | Westbrooks | ................. | A47G 7/041 |
| 2009/0229180 A1 * | 9/2009 | Rich | ................. | A01G 9/042 47/66.6 |
| 2016/0100536 A1 * | 4/2016 | Wu | ................. | A01G 31/06 47/64 |
| 2019/0261586 A1 * | 8/2019 | Hoff | ................. | A01G 27/006 |

FOREIGN PATENT DOCUMENTS

| | | | | |
|---|---|---|---|---|
| KR | 1931303 | * | 5/2018 | ............... A01G 9/04 |
| WO | 2019074162 | * | 10/2017 | ............... A01G 9/04 |
| WO | 2020031127 | * | 8/2019 | ............... A01G 9/04 |

* cited by examiner

*Primary Examiner* — Kristen C Hayes
(74) *Attorney, Agent, or Firm* — Elliott, Ostrander & Preston, P.C.

(57) ABSTRACT

A potted plant tray includes a tray bottom portion comprising a floor, a sidewall, and an outlet, and a tray top portion comprising a perforated inner floor and one or more bottom supports to support the tray top portion above the tray bottom portion.

19 Claims, 6 Drawing Sheets

US 11,246,268 B2

POTTED PLANT TRAY

CLAIM OF PRIORITY

This U.S. nonprovisional patent application claims priority to U.S. provisional patent application No. 62/711,126, filed Jul. 27, 2018, the entire contents of which are incorporated herein by reference.

TECHNICAL FIELD

Embodiments of the invention are in the field of accessories for household plants and home gardens and, in particular, potted plant trays providing air and water flow.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Proper airflow and water drainage for potted plants is difficult with many standard potted plant trays and saucers. Air cannot flow underneath potted plants very well and there are few potted plant trays with channels or spouts for good water drainage. Most potted plant tray products also have a flat solid bottom, which does not allow proper airflow to the holes on the bottom of a pot. Plants that are grown in cloth pots may also face this problem. Good airflow underneath a potted plant is essential for the health of its root system, and proper water drainage is essential for removing salts and mineral waste from the soil and root system. Holes can be made manually for drainage but doing so can be difficult and imperfect. It is very difficult to do without water draining in undesired directions. Risers may be used to lift plant pots out of waste accumulation and provide airflow, however, they make it even more difficult to remove fluids from the tray or saucer. Risers are bulky and obstruct a tray bottom where water gathers, making maintenance difficult and messy. Wet vacuum cleaners have been used to clear away waste from the tray. Without proper maintenance, plants soak their own waste back into their soil over time, which is detrimental to plant health.

The present state of the art may therefore benefit from a potted plant tray as is described herein.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION

Described herein are solutions to provide air flow and water drainage to domestic potted plants via a tray with one or more perforations and drainage capability allowing easy collection and channeling of drained fluid to a drainage opening or spout for expulsion. Also described are structures for stabilizing and keeping potted plants level.

In such a way, embodiments of the invention improve potted plant health by delivering oxygen to its root system and removing salts and other wastes through channeled fluid drainage, while avoiding inconvenience and messy clean-up on the part of the plant care taker.

The embodiments of the invention are user friendly and reduce the effort involved in maintaining proper water drainage with the added benefit of providing airflow underneath a potted plant. The detachable top and bottom portions of the tray make it easy to clean and maintain.

Figure 1:
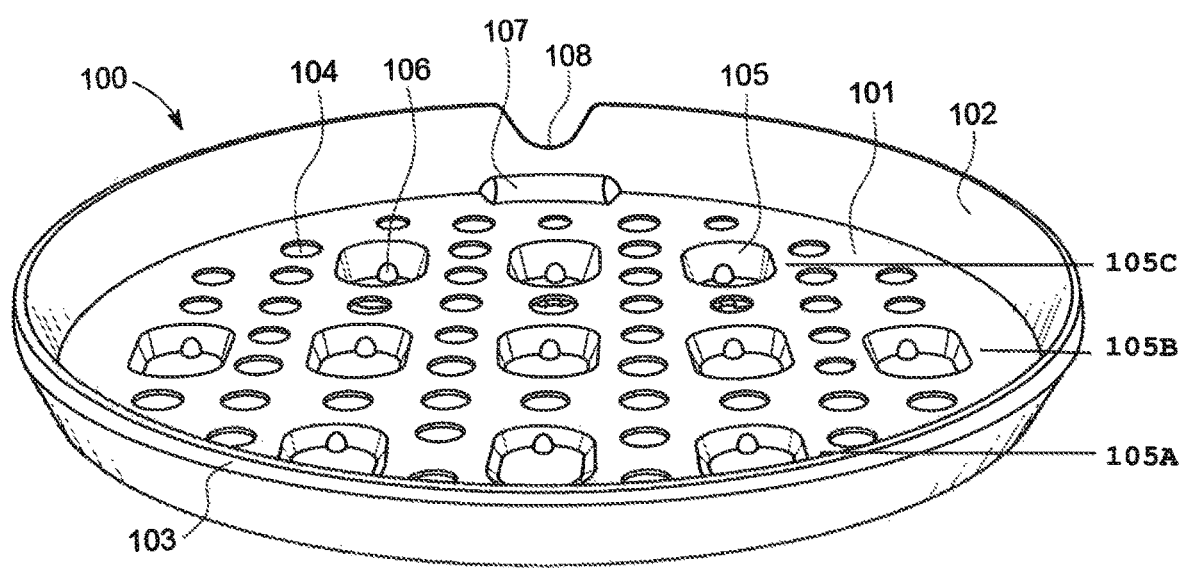
FIG. 1 depicts a top rear perspective view of a plant tray's top portion.
Figure 2:
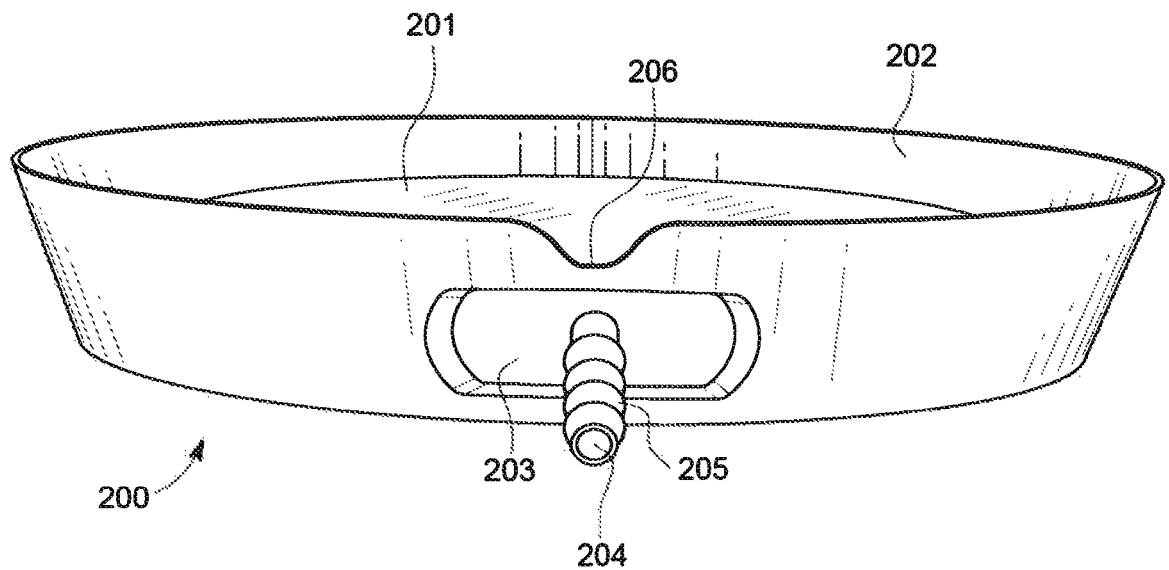
FIG. 2 depicts a front perspective view of a plant tray's bottom portion.

With reference to FIGS. 1 and 2, one embodiment comprises a tray that holds a potted plant on a perforated top portion (tray top) 100, and a drainage collection and removal portion (tray bottom) 200 below the tray top 100, that allows water to drain in a chosen direction, while allowing continuous airflow. The tray top 100 has an inner floor 101 with a perforated design comprising one or more apertures/perforations 104 that allow air and water to flow freely. These one or more apertures/perforations may be organized across the inner floor 101 or randomly distributed. The tray bottom 200 has a side wall 202 and a floor 201 that channels fluids to an opening or outlet 204. In various embodiments, the tray bottom floor 201 may be angled or sloped to facilitate fluid movement toward the opening 204, and the opening/outlet may be a drainage spout. The tray bottom can be hollowed underneath for manufacturing purposes, with ribs or beams for supports. In certain embodiments, the tray bottom has a rim fitment dip 206 in its sidewall that allows for stacking of the product without damaging the drainage spout during shipping or storage. In one embodiment, tray top and tray bottom are detachably coupled to each other. In another embodiment, the embodiment is made as one piece.

It will be recognized, however, that in many of its aspects embodiments of the invention not limited to saucers or trays of a particular type but generally applicable to trays of various types and materials. It will also be apparent to one skilled in the art that certain specific details need not be employed to practice the embodiments disclosed.

Construction of embodiments of the invention may involve using an injection mold, a CNC machine, woodcarving, or 3D printing. Once the pieces have been created, they only need to be fit together with the ease of setting the tray top 100 on top of or within the tray bottom 200 to function.

FIG. 1 depicts an exemplary tray top 100, according to an embodiment, for receiving, stabilizing and ventilating potted plants of different sizes. The tray top 100, according to an embodiment, comprises an inner floor 101, an optional sidewall 102 with a rim fitment dip 108, outer diameter lip 103, one or more floor perforations 104, one or more bottom supports 105, bottom support perforations 106, and a recessed fitment bump 107. One or more floor perforations 104 throughout inner floor 101 allow air to flow freely underneath the potted plant. Floor perforations 104 could be in any shape or design such as circles, squares, rectangles, or even a grate-like pattern. Excess or runoff fluids pass through these perforations 104, and bottom support perforations 106, to the tray bottom 200 (see FIG. 2), which catches and channels such fluids to a desired location for removal.

According to one embodiment, bottom supports 105 may be organized across the inner floor 101 or randomly distributed. Furthermore, the depth or height of bottom supports 105 is the same. In another embodiment, the height of bottom supports 105 varies, for example, linearly, from one side of the tray top 100 to the other side of the tray top, so that the tray top is level when placed on top of a sloping or angled floor 201 of tray bottom 200, as further described below. So, for example, bottom support 105A and the two bottom supports to the left of bottom support 105A form a row of bottom supports having a first height or depth, bottom support 105B and the four bottom supports to the left of bottom support 105B form a row of bottom supports having a second height or depth greater than the first height or depth, and bottom support 105C and the two bottom supports to the left of bottom support 105C form a row of bottom supports having a third height or depth greater than the second depth. Such an embodiment would accommodate a floor 201 of tray bottom 200 that slopes downward, from the side of tray top 100 near which is located the row of bottom supports including the bottom support 105A, to the other side of tray top 100 near which is located the row of bottom supports including the bottom support 105C. While the embodiments depicted in the figures illustrate a number of bottom supports that each form a cavity in inner floor 101 having one or more perforations for drainage of water that flows into the cavity, according to another embodiment, the bottom supports are solid posts or columns attached to and protruding or extending downward in a vertical direction from the bottom side of inner floor 101 and that rest or stand on the floor 201 of tray bottom 200. The bottom supports may also be posts attached to the bottom floor of the tray bottom that protrude or extend upward in a vertical direction from the top side of floor 201 to support the inner floor 101 of the tray top from underneath it. In yet another embodiment (not illustrated), a single bottom support holds up tray top 100, for example, a bottom support in the shape of a ring (lip) concentrically positioned under the tray top 100, attached to either the inner floor 101, floor 201, or neither.

While the embodiments disclosed herein contemplate a potted plant with a circular bottom, and, therefore a tray top 100 and tray bottom 200 having circular shapes, it is appreciated that tray top 100 and tray bottom may involve other geometric shapes, such as oval, square, rectangular, hexagonal, octagonal, concave, convex, conical or other polygon shapes.

In an embodiment in which tray top does not include sidewall 102, the tray top is essentially a perforated disc or plate resting on top of the rim/top edge of the sidewall of the tray bottom or the disc or plate has a smaller circumference than the top edge of the tray bottom's sidewall so that it rests below the top edge of the tray bottom's sidewall.

In another embodiment, the tray top inner floor 101 has no perforations, and the one or more bottom supports 105 contain one or more perforations 106 to facilitate airflow and drainage of fluid into the tray bottom.

In one embodiment, the tray top can be secured to the tray bottom by an outer diameter lip at either inner floor 101 or the top edge of optional sidewall 102 that fits on the rim of the sidewall 202 of tray bottom 200, and/or bottom supports 105. In one embodiment, the outer diameter lip of the inner floor 101 or sidewall 102 is smaller in circumference than the circumference of the top edge of sidewall 202 of tray bottom 200 and therefore rests on the tray bottom sidewall somewhere between where the tray bottom sidewall begins at the edge of floor 201 of tray bottom 200 and the top edge of tray bottom sidewall 202.

FIG. 2 depicts a front perspective view of the tray bottom (drainage removal portion) 200 comprising a floor 201. In one embodiment, floor 201 is a sloping, or an angled, floor 201. In another embodiment, floor 201 does not slope. Tray bottom further comprises a sidewall 202, a recessed fitment cavity 203, a drain opening/outlet, e.g., a hole or spout 204, with fitment notches 205 (optional), and rim fitment dip 206. Tray bottom 200 catches and channels excess and runoff fluids entering through top tray 100 floor perforations 104 to a desired location for removal via drain opening or spout 204. Sidewall 202 helps to contain fluids in tray bottom 200. Fluids can be removed either by catching them in a bucket, turning or rotating the tray so that the drain spout 204 drains in a specific direction, or connecting a tube or hose of variable diameter to the drain spout 204, for example, via its fitment notches 205, for further channeling. A number of different spout shapes or designs are possible, including for example, variable fitment notch 205 diameter, shape and threading, as well as variable length of the drainage spout 204 itself, according to embodiments of the invention.

Figure 3:
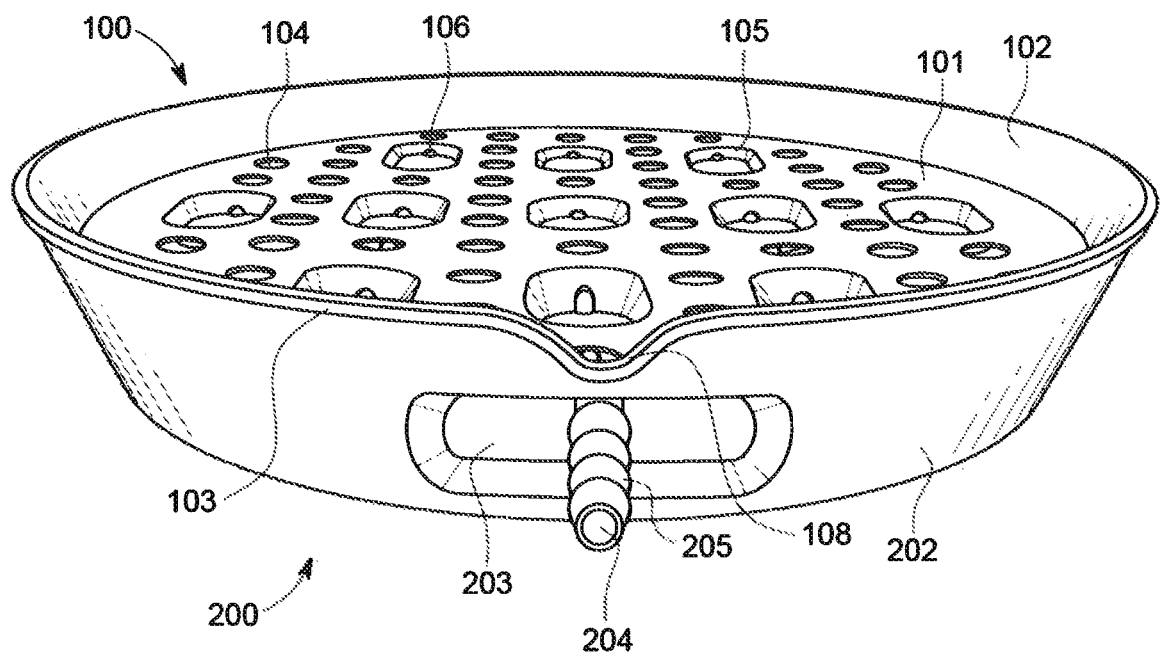
FIG. 3 depicts a top front perspective view of the plant tray's top and bottom portions assembled together.

Tray top 100 fits on top of bottom tray 200, according to an embodiment, as shown in FIG. 3, which depicts a top front perspective view of the plant tray's top portion 100 and bottom portion 200 assembled together. Tray top outer diameter lip 103 engages and protrudes over tray bottom sidewall 202, suspending tray top 100 above or within tray bottom 200. This embodiment illustrates tray top having a sidewall 102. In another embodiment, no such sidewall 102 exists, and outer diameter lip 103 is located at the outer edge of tray top floor 101, that is, along the circumference of tray top floor inner 101. In such an embodiment, the circumference of tray top floor inner 101 is at least greater than the circumference of tray bottom floor 201 and may be less than, equal to, or greater than the circumference of the top edge of sidewall 202. Potted plants sit on top of inner floor 101 which steadies and levels them by utilizing a number of perforated or non-perforated bottom supports 105 of different heights or depths to offset the tray bottom's 200 sloping or angled floor 201 (see FIG. 2). In one embodiment (not illustrated), tray top 100 sits atop tray bottom 200 and is supported by the top edge of tray bottom sidewall 202 without being suspended within the tray bottom 200. In another embodiment (not illustrated), tray top 100 is supported by an inner ledge, inner ring/lip or other supports attached to the sidewall of tray bottom 200. The inner floor 101 of tray top 100 serves as a ceiling for tray bottom 200 when the apparatus is assembled.

The tray top 100 and the tray bottom 200 both have a rim fitment dip 108 and 206 respectively, in their front outer diameter so that the two portions can be stacked on top of each other for shipping and storage in assembled form without damaging drainage spout 204, according to an embodiment. In particular, tray bottom sits comfortably onto a tray top and the spout of the tray bottom sits into the dip of the tray top without touching the sidewall of the tray top so that multiple trays can be stacked neatly. When in use, tray top 100 is stacked on top of tray bottom 200 by engaging tray top rim fitment dip 108 on top of bottom tray rim fitment dip 206. This allows for fitment of the tray top 100 on top of tray bottom sidewall 202 so that the tray top 100 does not slide out and damage the drain spout 204 during shipping or storage. The outer diameter lip 103 of tray top 100 provides added fitment by extending around the top diameter of sidewall 102 for support and fitment with the top edge of tray bottom 200 sidewall 202. Tray top's recessed fitment bump 107 is positioned in fitment with the tray bottom's recessed fitment cavity 203.

Figure 4:
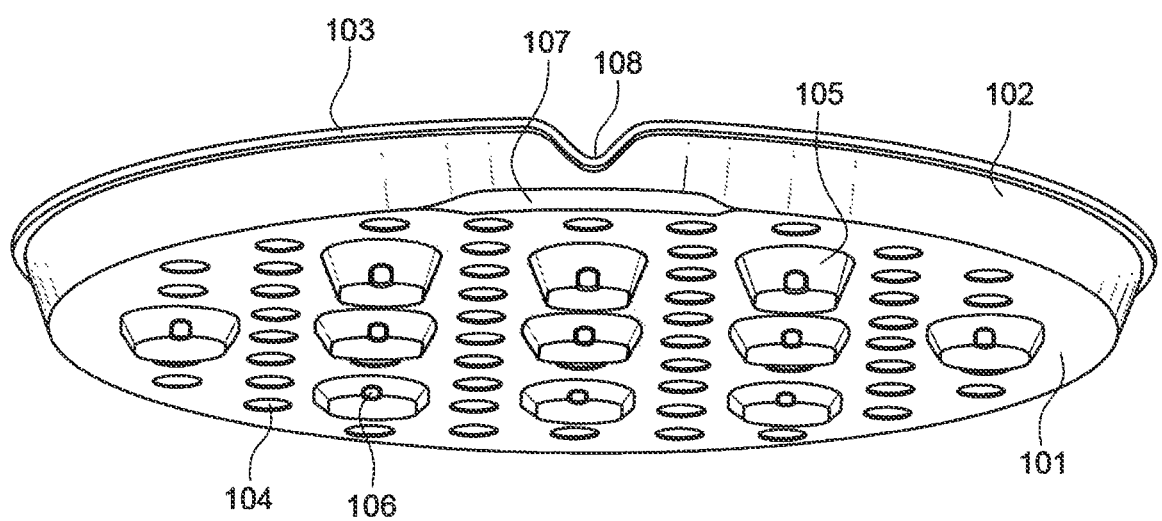
FIG. 4 depicts a bottom front perspective view of the tray's top portion.

FIG. 4 depicts a bottom front perspective view of the tray top 100. The bottom of tray top 100 serves as the ceiling for tray bottom 200 when the tray top is placed on top of tray bottom 200, that is, when the embodiment is assembled. Similar elements shown in FIG. 1 are shown here including inner floor 101, optional sidewall 102, outer diameter lip 103, one or more floor perforations 104, one or more bottom supports 105, bottom support perforations 106, recessed fitment bump 107, and rim fitment dip 108. Excess or runoff fluids also pass through perforations 104 and bottom support perforations 106 to tray bottom 200 (see FIG. 2), which catches and channels such fluids to a desired location.

Figure 5:
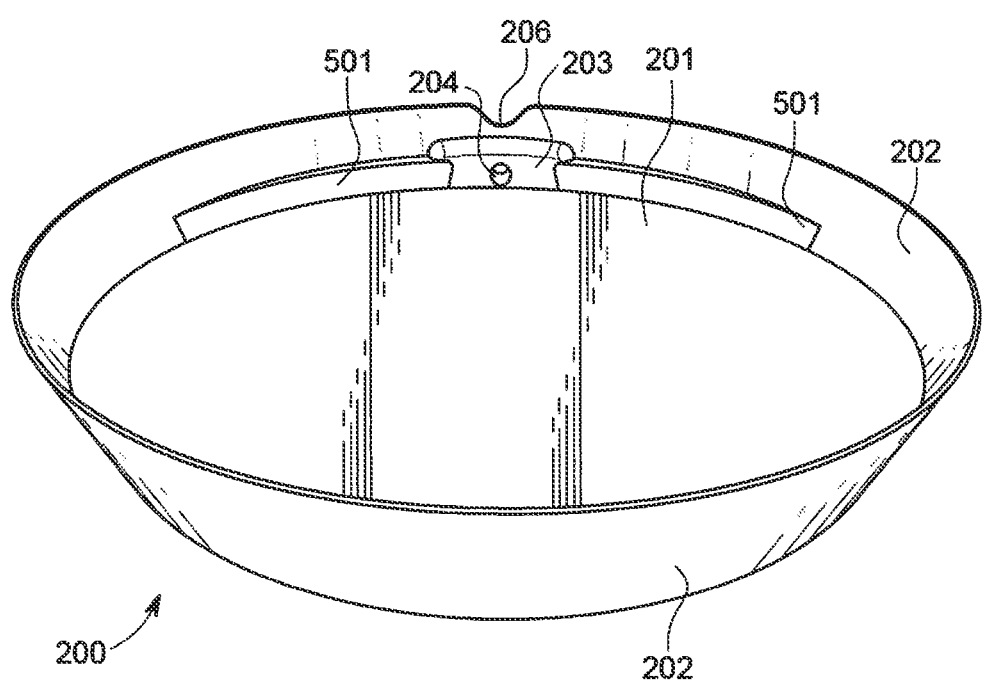
FIG. 5 depicts a top rear perspective view of the tray's bottom portion.

FIG. 5 depicts a top rear perspective view of the tray bottom 200. Similar elements shown in FIG. 2 are shown here including floor 201, e.g., angled or sloping floor 201 in the illustrated embodiment, sidewall 202, recessed fitment cavity 203, drain spout 204 and rim fitment dip 206. Of particular note, inner supports 501 act as supports and channels for directing fluid inward towards drain spout 204. Angled floor 201 fits angled bottom supports 105 and also channels fluid toward drain spout 204 for drainage. Tray bottom angled floor 201 or tray bottom 200 itself could be sloped or angled in any number of ways to achieve channeling. Tray bottom 200 also has recessed fitment cavity 203 for recessing drain spout 204 back inwards into the front of tray bottom 200, providing recessed space for tubing or hose fitment and minimizing the protrusion of drain spout 204, making it less likely to bump or break.

Figure 6:
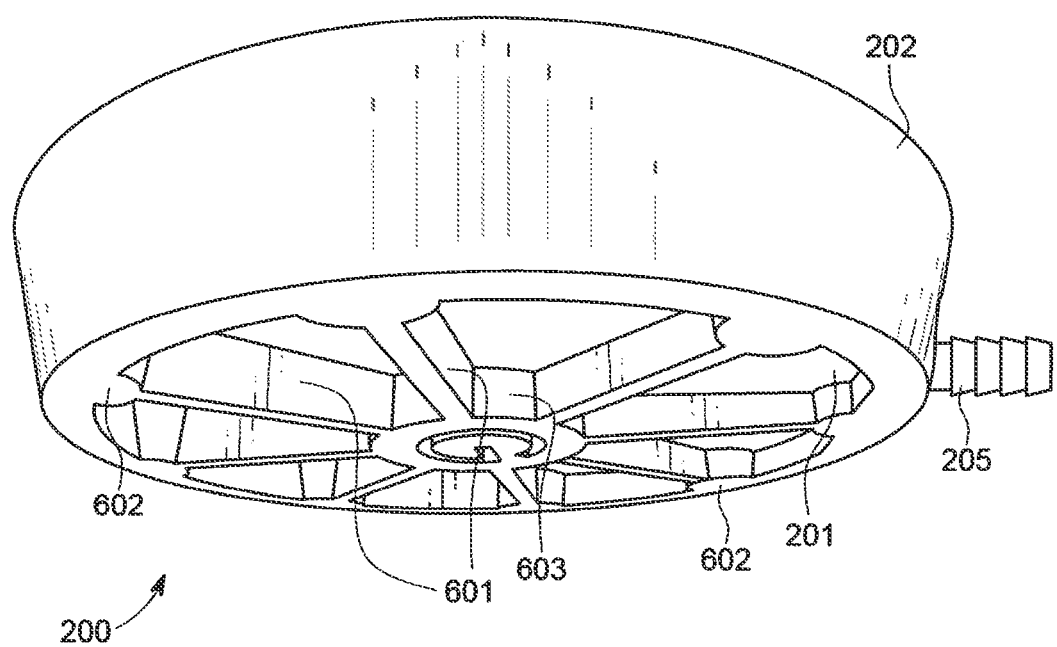
FIG. 6 depicts a bottom right side perspective view of the tray's bottom portion.

FIG. 6 depicts a bottom right side perspective view of tray bottom 200. Below tray bottom's floor 201 lies bottom supports or ribs 601 radiating outwards from bottom center support 603 located at the center of tray bottom's 200 bottom. Bottom supports or ribs 601 connect to the sides of bottom rib side supports 602. Bottom center support 603 functions to hold weight and provide stability. A hollow cavity or bottom is created in the space below floor 201 and above the plane made up of bottom center support 603, bottom supports or ribs 601 and bottom rib side supports 602. These elements could be combined in any number of ways and designs to achieve support. In some embodiments, the tray bottom may not be

What is claimed is:
1. A potted plant tray, comprising:
 a tray bottom portion comprising:
 a floor;
 a sidewall; and
 an outlet;
 a tray top portion comprising:
 a uniformly perforated continuous single-planar inner floor; and
 one or more bottom supports to support the tray top portion above the tray bottom portion.
2. The potted plant tray of claim 1, wherein the tray top and tray bottom portions are detachable from each other.

3. The potted plant tray of claim 1, wherein the tray top and tray bottom portions have a fitment dip allowing for the top tray portion to be securely attached on top of the bottom tray portion.
4. The potted plant tray of claim 3, wherein the fitment dip of the tray top portion engages the fitment dip of the tray bottom portion, wherein anchoring the tray top portion and guiding the tray top portion to be further securely stacked on top of the tray bottom portion.
5. The potted plant tray of claim 1, wherein the top tray portion comprises a sidewall.
6. The potted plant tray of claim 5, wherein the tray top portion sidewall has an outer diameter lip that engages and protrudes over a top edge of the tray bottom sidewall, providing fitment and suspending the tray top portion within the tray bottom portion when the tray top and bottom portions are assembled.
7. The potted plant tray of claim 1, wherein the tray top portion rests on top of the top edge of the tray bottom sidewall without suspension.
8. The potted plant tray of claim 1, wherein the tray top portion has a smaller circumference than the tray bottom portion and the tray bottom sidewall below the top edge of the tray bottom sidewall engages the tray top portion.
9. The potted plant tray of claim 1, wherein tray top's inner floor serves as a ceiling for the tray bottom portion when assembled.
10. The potted plant tray of claim 1, wherein the tray bottom's floor is angled or sloped.
11. The potted plant tray of claim 1, wherein the one or more bottom supports protrude from the bottom of the tray top portion and have variable height from one side of the tray top portion to the other side of the top tray portion, wherein offsetting the angled or sloped floor of the tray bottom portion so that the tray top is level when assembled.
12. The potted plant tray of claim 1, wherein the tray top's one or more bottom supports form a cavity in the tray top's inner floor.
13. The potted plant tray of claim 12, wherein the tray top's bottom supports have one or more perforations for drainage of fluid that flows into the cavity.
14. The potted plant tray of claim 1, wherein the bottom supports comprise one or more posts protruding from tray bottom's floor to support the tray top portion.
15. The potted plant tray of claim 1, wherein the outlet/opening is a drainage spout.
16. The potted plant tray of claim 1, wherein the drainage spout is recessed via a recessed fitment cavity.
17. The potted plant tray of claim 16, wherein the top tray portion accommodates the recessed fitment cavity via a recessed fitment bump.
18. The potted plant tray of claim 16, wherein the drainage spout has one or more fitment notches allowing for the connection of hoses and tubes of variable diameter and shape.
19. The potted plant tray of claim 1, wherein a hollow cavity is created under the tray bottom's floor by extended tray bottom sidewalls connected via bottom ribs and supports.

* * * * *